United States Patent [19]

Galley

[11] Patent Number: 5,087,015
[45] Date of Patent: Feb. 11, 1992

[54] ADJUSTABLE CONTACT LENS MOLD

[76] Inventor: Geoffrey H. Galley, Red Lodge, The Close, Totteridge, London, United Kingdom, N20 8PJ

[21] Appl. No.: 462,166

[22] Filed: Jan. 8, 1990

[30] Foreign Application Priority Data

Jan. 12, 1989 [GB] United Kingdom ............... 8900616

[51] Int. Cl.⁵ .............................................. B29D 11/00
[52] U.S. Cl. ...................................... 249/82; 264/2.2; 425/808
[58] Field of Search ............... 249/82, 155; 264/2.2, 264/2.3, 339; 425/808, 555

[56] References Cited

U.S. PATENT DOCUMENTS

| | | | |
|---|---|---|---|
| 3,605,195 | 9/1971 | Campbell | 425/808 |
| 4,095,772 | 6/1978 | Weber | 249/82 |
| 4,197,266 | 4/1980 | Clark et al. | 264/2.3 |
| 4,208,364 | 6/1980 | Shepherd | 264/2.2 |
| 4,211,384 | 7/1980 | Bourset et al. | 425/808 |
| 4,340,482 | 6/1983 | Feurer | 425/808 |
| 4,469,464 | 9/1984 | Rawlings | 264/2.2 |
| 4,534,723 | 8/1985 | Dillon et al. | 425/808 |
| 4,761,069 | 8/1988 | Truong et al. | 264/2.3 |
| 4,865,779 | 9/1989 | Ihn et al. | 264/2.2 |
| 4,955,580 | 11/1987 | Seden et al. | 264/2.2 |

OTHER PUBLICATIONS

Spencer Chemical Company, "Integral Hinge", Jul. 1963.

*Primary Examiner*—Jay H. Woo
*Assistant Examiner*—Robert B. Davis
*Attorney, Agent, or Firm*—Klauber & Jackson

[57] ABSTRACT

A plastics material mold for casting a contact lens from curable material. Disposable male and female mold members (20,22;50,51) define a mold cavity and each having a curved surface (21,23;52,54) for molding respective optical surface of the contact lens, the male mold member having a shoulder (26,53) which is a slidable fit with a generally cylindrical, e.g. frusto-conical, surface (25,55) on a female mold member to permit relative mold member movement during curing without substantially affecting the optical quality of the molded optical surfaces. The sliding fit shoulder and female surface are relatively simple to mold with accuracy and thus permit the edge (29) of the eventual cast lens to be formed relatively reliably and accurately.

10 Claims, 4 Drawing Sheets

FIG. 1A    PRIOR ART
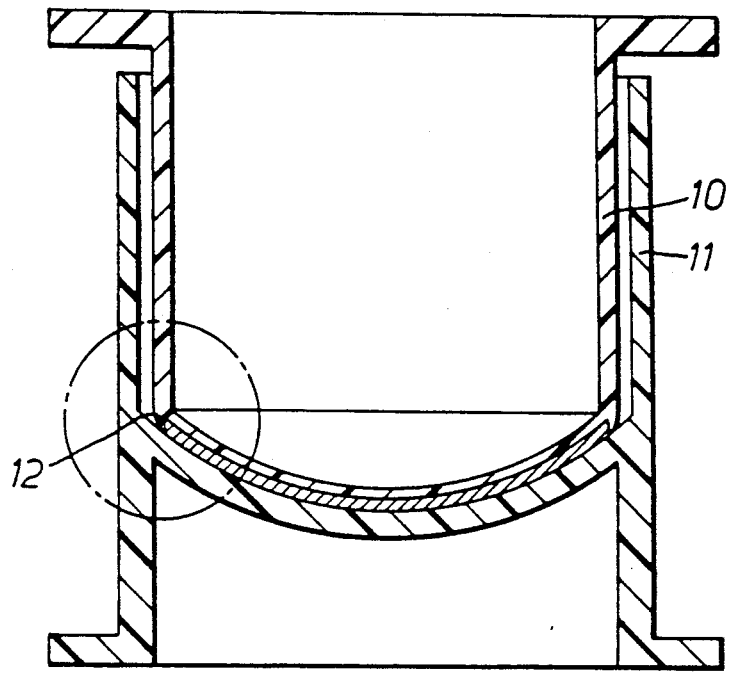
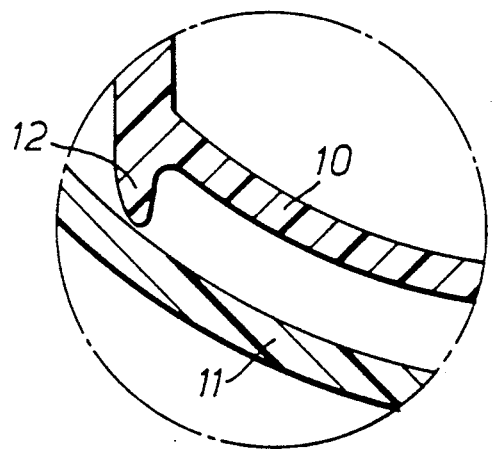
FIG. 1B    PRIOR ART

ADJUSTABLE CONTACT LENS MOLD

FIELD OF THE INVENTION

This invention relates to the manufacture of contact lenses by cast molding technology, and in particular to disposable plastics material molds for casting contact lenses.

BACKGROUND OF THE INVENTION

Contact lenses are traditionally manufactured by several means including "lathing", "spin casting" and "cast molding". Each of the above methods possesses advantages in terms of the cost of production of lenses or the variety of lens designs and materials which may be produced. Cast molding offers significant advantages in respect of relatively low cost of capital plant employed in the production process as well as low unit cost of production while being utilisable over a wide range of polymeric materials.

Present methods of cast molding described in U.S. Pat. No. 4,208,364 (Shepherd) and U.S. Pat. No. 4,284,399 (assigned to American Optical Corporation) suffer in practice from relatively low production yields due to defects in or originating from the edge of the cast lens, and in the case of the method described in U.S. Pat. No. 4,209,289 (assigned to American Optical Corporation), from numerous instances of poor optical quality.

U.S. Pat. No. 4,208,364 (Shepherd) teaches the casting of a lens between two disposable plastic mold members one of which is provided with a deformable lip which facilitates the relative movement of the mold members towards each other in order to compensate for the shrinkage of the lens polymer which occurs during polymerization. Said movement maintains contact between the optical surfaces of the mold members and the lens polymer thus ensuring good optical quality of the lens. However, said deformable lip against which the edge of the lens is formed, being of a disadvantageous cross-sectional form and minute dimensions, is difficult to produce to the required degree of precision by the specified injection molding process.

The resulting lens edges frequently exhibit imperfections which may become more pronounced during the process of removing the formed lens from the assembled mold members. Such imperfections existing in the edge of the lens often cause the lens to be judged as unfit for use. In addition, such imperfections often form sites for the initiation of cracks which may propagate into the lens providing further cause for rejection of the lens on inspection.

A further limitation of the method taught in the Shepherd patent results from variable deformation of the described flexible lip which in turn results in variation of the edge thickness around the lens and, at times, in unacceptable variation in the lens centre thickness.

As a result of the above deficiencies, the production yield of lenses manufactured by the Shepherd method, being the number of lenses produced from a given number of cast moldings, is generally of the order of 50% or less.

The method described in U.S. Pat. No. 4,284,399 (assigned to American Optical Corporation) does not provide a means for the mold members to move towards each other during polymerization other than by deformation of the surfaces of the mold members, which appears to be assisted by the loading of the assembled members with a weight of "two to three pounds". The deformation of the surfaces of the mold members can be expected to result in loss of optical quality in the molded lens.

The method can further suffer from imperfections in the lens edge which is formed against the junction line between the two mold members. Misalignment of the mold members on assembly of the members prior to polymerisation of the lens forming monomer may occur due to variation in the actual size of the mold members produced from given tooling at different times. Any such misalignment will result in a deformation of the lens edge.

A further limitation of the method described in the American Optical patent lies in the fact that the configuration of the portion of the female mold member at the point where the edge is formed against such member, being of disadvantageous cross-sectional form and minute dimensions, does not lend itself to production by the injection molding process specified in the patent. The lens edge form shown in the patent could not therefore be effectively molded without deformation resulting from imperfections in the said portion of the female mold member.

SUMMARY OF THE INVENTION

It is an object of the present invention to overcome the described edge-related problems by providing a mold and a method which will result in an acceptable edge form while at the same time providing a means for the mold members to move towards each other in order to compensate for shrinkage which occurs during the polymerization of the lens forming monomer.

A further object of the invention is to provide a configuration for the respective mold members which can be readily molded by a conventional injection molding process such that the lens edge form described may be reliably achieved utilizing the said mold members.

According to the present invention there is provided a plastics material mould for casting a contact lens from curable material, said mold comprising:

male and female mold members adapted to fit together to define a mold cavity; and said male and female mold members each present a curved surface for molding a respective desired optical surface of a contact lens;

characterized in that said male mold member has a shoulder surrounding its optical curved surface;

said female mold member presents a generally cylindrical surface surrounding its optical curved surface; and said shoulder is a slidable fit with said generally cylindrical surface when the mold members are assembled to permit the mold members to move relative to one another during curing of said curable material introduced into the mold cavity to cast a lens.

In another aspect the invention provides a method of casting a contact lens from curable material characterized by the steps of: providing disposable male and female mold members which fit together to define a mold cavity and each present a curved surface for molding a respective desired optical surface of the contact lens, the male mold member having a shoulder surrounding its optical curved surface, and the female mold member presenting a generally cylindrical surface surrounding its optical curved surface;

charging the female mold member with a predetermined dose of monomeric material;

assembling the charged female member with the male member with the shoulder being an engaging slidable fit with the generally cylindrical surface;

curing the monomeric material while permitting the mold members to move relative to one another with the shoulder in sliding engagement with the generally cylindrical surface; and removing the cast lens from the mold members.

The embodiments of the invention will now be described, by way of example only, with reference to the accompanying drawings, in which:

BRIEF DESCRIPTION OF THE DRAWINGS

FIG. 1a is a vertical section through the prior art Shepherd mold;

FIG. 1b is an enlarged fragmentary view of an edge portion of the Shepherd mold;

FIG. 3b is an enlarged fragmentary view of an edge portion of the mold of FIG. 3a;

FIGS. 1a and 1b show the prior art Shepherd mold having male and female mold members 10,11 the male member having a deformable lip 12. The practical disadvantages of this arrangement have been described above, in particular that the deformable lip 12, against which the edge of the lens is formed, is of disadvantageous cross-sectional form and minute dimensions.

FIGS. 2a to 2c show the prior art American Optical mold having male and female mold members 15,16 provided with abutting annular seats 17,18. The practical disadvantages of this arrangement have been described above, in particular that the seats 17,18 do not provide means for the mold members to move towards each other during polymerization other than by deformation of the mold members. In addition the seat portion 18 of the female member, against which the edge of the lens is formed, is again of disadvantageous cross-sectional form and minute dimensions. While FIG. 2b shows an idealised shape, in practice the shape tends to be variable and more as shown in FIG. 2c.

DETAILED DESCRIPTION OF THE EMBODIMENTS

Figure 2A:
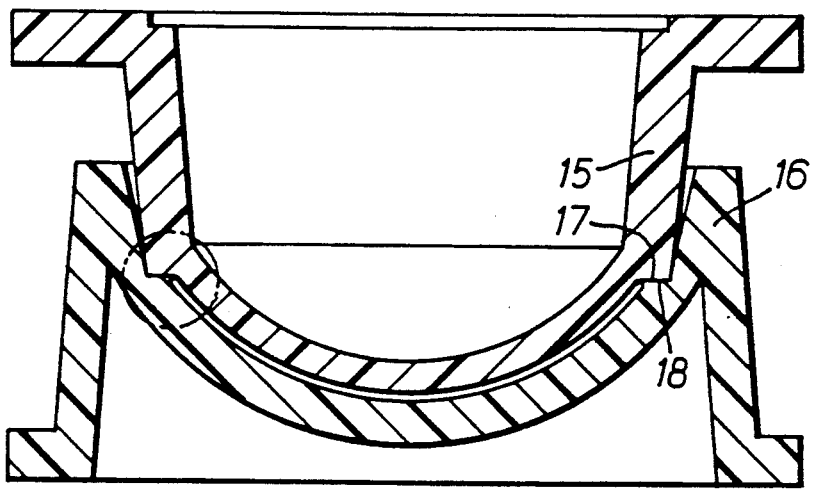
FIG. 2a is a vertical section through the prior art American Optical mold.
Figure 2B:
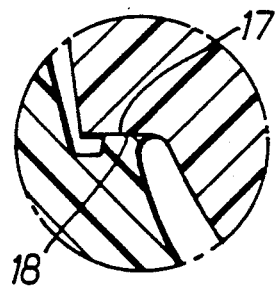
FIG. 2b is an enlarged fragmentary view of an idealized edge portion in that mold.
Figure 2C:
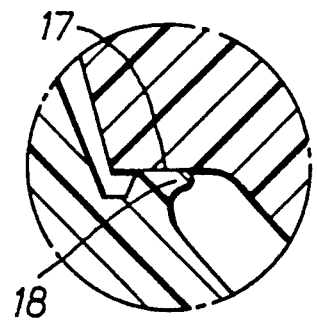
FIG. 2c is an enlarged fragmentary view of an actual edge portion of that mold.
Figure 3A:
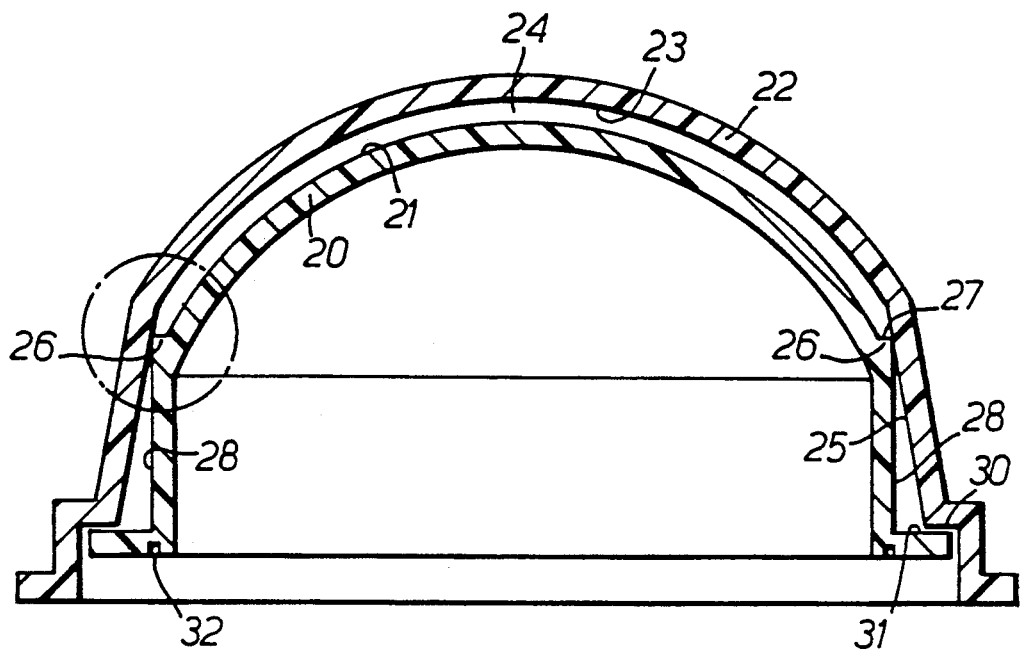
FIG. 3a is a vertical section through a mold according to the present invention.
Figure 3B:
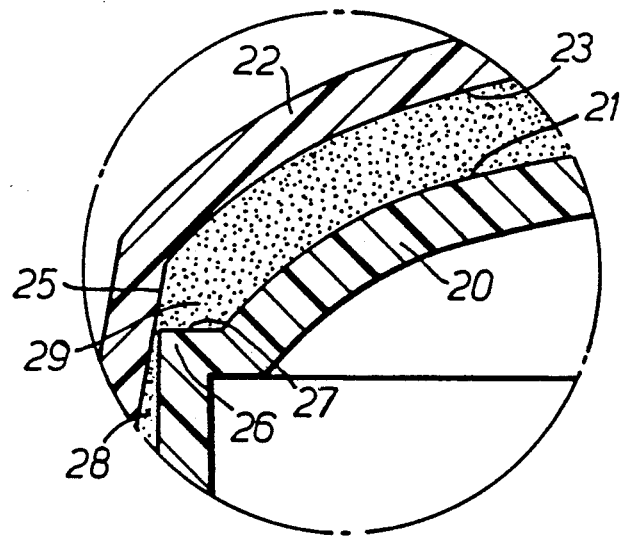

FIGS. 3a and 3b show an embodiment of the present invention. A mold member 20 having a convex optical surface 21 is generally referred to as the male mold member and the base curve of the cast contact lens is formed against the optical surface 21. A mold member 22 having a concave optical surface 23 is generally referred to as the female mold member and the anterior surface of the cast contact lens is formed against the optical surface 23. The male and female mold members fit together to define a mold cavity 24 within which the lens is cast.

The mold members 20,22 may conveniently be manufactured by an injection molding process using a thermo-molding polymer such as poly-propylene.

The female mold member 22 is provided with a generally cylindrical surface 25 which may be a right circular cylindrical surface or which may advantageously be of a frusto-conical form (as shown in FIGS. 3a and 3b) so as to provide a lead-in for the opposing shoulder of the male mold member 20 which mates with the said cylindrical surface 25 of the female mold member upon assembly of the mold members prior to polymerization of the lens monomer. The male mold member is provided with a shoulder 26 surrounding its optical curved surface 21. The shoulder presents a substantially right-angled corner formed by the junction of a first annular surface 27 facing the female mold member and a second right circular cylindrical surface 28.

The female mold member 22 is assembled with the male mold member 20 after first being charged with a metered dose of monomeric material from which the contact lens will be formed by polymerization. Polymerisation of the monomeric material is then effected by heating the assembly in a waterbath or temperature-controlled oven or by other means familiar to those skilled in the art such as ultra-violet radiation in which case at least one of the mold members must be formed from a material which is transparent or semi-transparent to such radiation.

The edge 29 of the lens is formed between the surface 27 of the shoulder 26 of the male mold and a portion of the cylindrical or frusto-conical surface 25 of the female mold as shown in FIG. 3b. The engagement of the corner at the junction between the surfaces 27 and 28 of the shoulder of the male mold member against the surface 25 of the female mold member provides a running seal between the two members through which excess monomeric material may escape from the cavity contained between the two mold members during the progressive assembly of the members.

During polymerization of the monomeric lens-forming material the male and female mold members may approach each other as the corner junction of surfaces 27 and 28 of the shoulder of the male mold member slides along the surface 25 of the female mold member. The positioning of the male mold member relative to the female mold member upon assembly of the members may be determined by appropriate adjustment of the stroke of the assembling means provided on a machine within or upon which the mold members are assembled.

Alternatively the mold members may be provided with mating flat ring surfaces respectively marked as 30 and 31 in FIG. 3a. In this case a hinging effect which occurs at the intersection of the surfaces 31 and 28 of the male mold member permits the surfaces of the mold members to move towards each other by means of the above described sliding of the shoulder of the male mold member along the cylindrical or frusto-conical surface of the female mold member. The male mold member may if required be weakened as shown at 32 by reduction of the wall thickness in the region of the point of intersection of the surfaces 31 and 28 so as to facilitate the above described hinging effect.

It will be noted that it is not necessary to place any load on the assembly during the polymerization process. The shrinkage of the monomeric material during polymerization serves to draw the two optical surfaces together by a combination of atmospheric pressure and adhesion of the respective surfaces of the mold members to the polymerizing monomeric material. The above described sliding fit between the surface 25 of the female mold member and the opposing shoulder 26 of the male mold member coupled with the hinging effect between surfaces 28 and 31 of the male mold member minimises the resistance to movement of the mold members towards each other under the influence of atmospheric pressure and or adhesive attachment of the respective surfaces of the mold members to the polymerizing monomeric material.

FIG. 3b is an enlarged view of the mold members in the region where the lens edge 29 is formed between the mold members. From this it will be seen that the configuration of each of the mold members in this region is such as to be readily moldable using conventional injection molding technology. Narrow and acutely angled cross-sections such as may be found in the region of the lip 12 on the relevant mold member of Shepherd or in the extreme edge 18 of the female mold member of American Optical have been avoided. Both mold members of the present embodiment have relevant cross-sections consisting of right angles or obtuse angles which may be accurately reproduced by conventional injection molding techniques.

Figure 4:
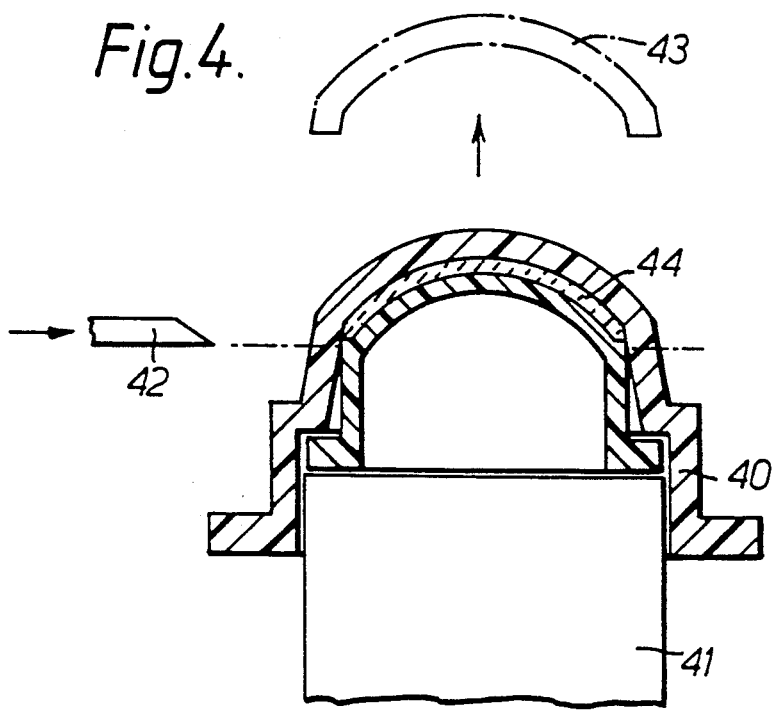
FIG. 4 is a vertical section through a second embodiment of a mold according to the invention adapted for mounting on a lathing machine.

As shown in FIG. 4, the disposable mold members may advantageously be designed incorporating a means 40 for mounting the mold members in their assembled form onto the rotating spindle 41 of a lathing machine (not shown) which may have cutting tool 42 to remove a portion 43 of the female mold member from the assembly so as to expose the front surface and a portion of the edge of the cast lens 44. After removal of the female mold portion 43 and lens 44 may be easily released from the male mold by distortion of the mold surface which may be achieved by a simple squeezing action applied at the base of the mold assembly.

In another embodiment (not shown) the portion of the female mold may be removed with the lens adhering to such portion from which it may subsequently be detached by a squeezing action applied across the diameter of the removed female mold portion.

The removal of the female mold portion as above described may be advantageously performed on a special purpose machine (not shown) wherein the loading of the mold assembly onto the rotating spindle and the machining of the portion of the female mold are carried out automatically.

The lens edge produced by the above described molds and methods is of an essentially triangular cross-section with its apex occurring at the approximate mid point of the edge. If a different cross-sectional edge profile is required the molded edge may be polished by conventional lens edge polishing means or by tumbling the lens utilizing small glass spheres in a manner similar to that used during the production of intra-ocular lenses.

Figure 5:
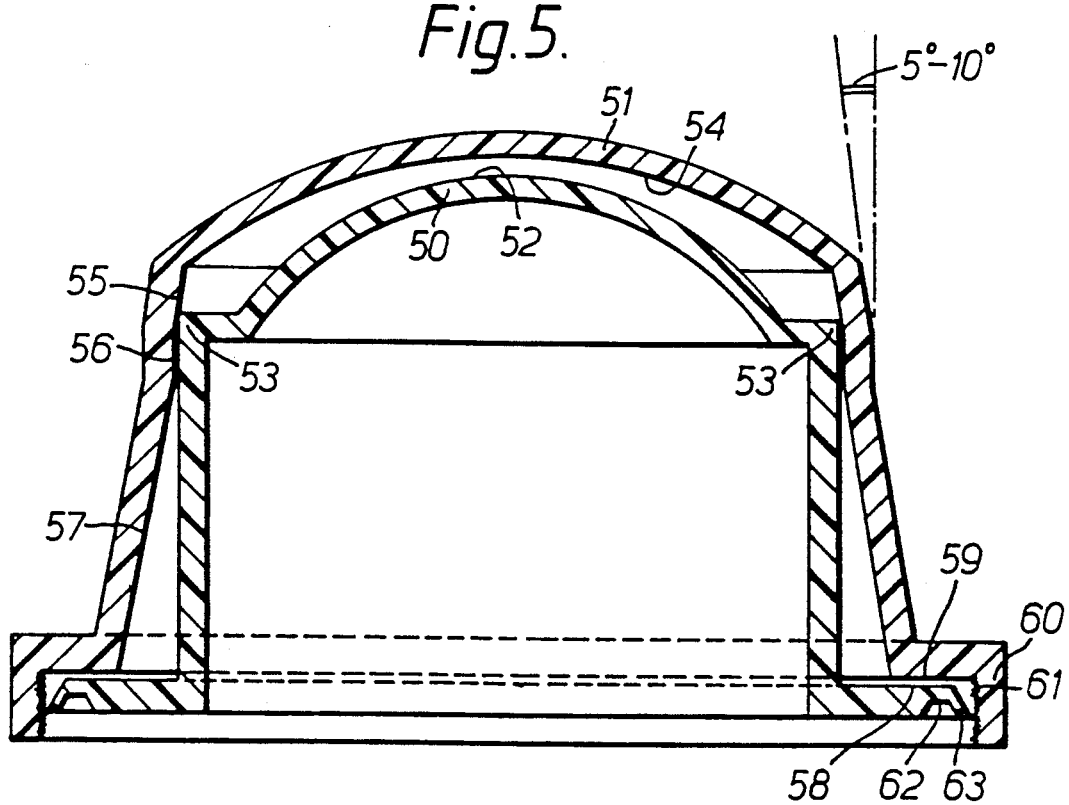
FIG. 5 is a vertical section through a third embodiment of a mold according to the present invention.

FIG. 5 shows a further embodiment comprising a male mold member 50 and a female mold member 51. The male mold has a convex optical surface 52 and a shoulder 53 similar to shoulder 26 described in relation to FIGS. 3a and 3b. The female mold has a generally cylindrical surface surrounding its concave optical surface 54. The generally cylindrical surface comprises first, second and third surfaces in succession away from the optical surface 54. The first surface is a frusto-conical surface 55 tapering outwardly at a taper angle preferably in the range of from 5° to 10°, for providing the slidable fit with the shoulder 53 of the male member as described in relation to FIGS. 3a and 3b. The second surface is substantially a right circular cylindrical surface 56 to improve seating of the mold members together upon assembly. The third surface is a frusto-conical surface 57 tapering outwardly away from the optical surface.

The mold members are provided with opposing planar ring surface portions 58 and 59 similar to ring surface portions 30 and 31 in FIG. 3a and for a similar purpose. The female mold member has a further cylindrical portion 60 outwardly of the ring portion 59, and the inner surface 61 of portion 60 is slightly roughened. The ring portion 58 of the male member has an annular groove 62 close to its outer edge to produce an annular resilient beak 63 dimensioned to be a resilient fit within the roughened cylindrical portion 60. Accordingly, the beak and the roughened portion provide a locking or ratchet effect as the male member moves towards the female member during assembly of the mold members and during subsequent curing. This embodiment is particularly suitable for the casting of lenses from monomer mixtures with highly volatile components, when the molds must be relatively firmly sealed together. During curing the male mold member can travel towards the female member to compensate for monomer shrinkage, as with the earlier described embodiments.

I claim:

1. A plastics material mold for casting a contact lens from curable material which shrinks during curing, said mold comprising:
    a male mold member;
    a female mold member;
    said male and female mold members being adapted to fit together to define a mold cavity;
    said male and female mold members each presenting a curved surface for molding a respective desired optical surface of a contact lens;
    said male mold member having a shoulder adjacent and circumferentially surrounding said curved surface of the male mold member, said shoulder presenting a substantially right-angled external corner in any cross-section around its circumference;
    said female mold member presenting a generally cylindrical surface adjacent and circumferentially surrounding said curved surface of the female mold member;
    said male and female mold members being provided with a means of initially limiting the motion of each towards the other during assembly of said mold members and subsequently permitting such movement during the curing of said curable material; and
    said external corner of said shoulder having a circumferentially continuous slidable fit with said generally cylindrical surface when the mold members are assembled to permit the mold members to move slidably directly towards one another during curing and consequent shrinkage of said curable material introduced into the mold cavity to cast a lens, said cast lens thereby having a circumferential edge formed between said external corner of said shoulder and said generally cylindrical surface.

2. A mold according to claim 1 wherein said shoulder of said male mold member presents a first planar annular surface perpendicular to the lens axis and facing the female mold member, and a second right circular cylindrical surface, said external corner being formed by the junction of said first and second surfaces.

3. A mold according to claim 1 wherein said generally cylindrical surface of said female mold member is a frusto-conical surface tapering outwardly away from the optical curved surface of the female mold member at a taper angle of up to substantially 10°.

4. A mold according to claim 1 wherein said generally cylindrical surface of said female mold member is substantially a right circular cylindrical surface.

5. A mold according to claim 1 wherein said generally cylindrical surface of said female mold member comprises first, second and third surfaces in succession away from the optical curved surface of the female mold member, said first surface is a frusto-conical surface tapering outwardly away from the optical curved surface of the female mold member at a taper angle of up to substantially 10°, for providing said slidable fit with the shoulder of the male mold member, said second surface is substantially a right circular cylindrical surface to improve sealing of the mold members together upon assembly, and said third surface is a frusto-conical surface tapering outwardly away from the optical curved surface of the female mold member.

6. A mold according to claim 1 wherein said male and female mold members are provided with opposing planar ring surface portions disposed outwardly of the slidable fit region, said opposing planar ring surface portions seating against one another when the mold members are assembled for curing the curable material to cast a lens.

7. A mold according to claim 6 wherein said planar ring surface portions comprise said means for initially limiting the motion of the mold members toward each other during assembly and permitting subsequent movement during curing, the planar ring surface portion of the male member being adapted to create a circumferential hinge zone about which the surface portion can move pivotally to permit said relative movement of the mold members during curing.

8. A mold according to claim 1 wherein said male and female mold members are provided one each with a circumferential roughened or ratchet surface and a circumferential resilient beak disposed outwardly of the slidable fit region, whereby the beak and said surface engage one another to tend to lock the mold members together when they are assembled for curing the curable material to cast a lens.

9. A mold according to claim 1 wherein said mold members are provided with integral means for mounting the mold members together onto a spindle of a lathing machine.

10. A plastics material mold for casting a contact lens from curable material, said mold comprising disposable male and female mold members adapted to fit together to define a mold cavity and each providing a curved surface for molding a respective desired optical surface of the contact lens, the male mold member having a shoulder which is a circumferentially continuous slidable fit with a generally cylindrical surface on the female mold member outwardly of the optical curved surfaces to permit relative mold member slidable movement directly towards one another during curing without substantially affecting the optical quality of the molded optical surfaces; said male and female mold members being provided with a means of initially limiting the motion of each towards the other during assembly of said mold members and subsequently permitting such movement during the curing of said curable material.

* * * * *